July 27, 1926.

Z. LITTMAN

TIRE RIM

Filed Dec. 20, 1924    5 Sheets-Sheet 1

1,593,877

INVENTOR
Zeno Littman
BY
ATTORNEY

July 27, 1926.

Z. LITTMAN

TIRE RIM

Filed Dec. 20, 1924     5 Sheets-Sheet 2

1,593,877

INVENTOR
Zeno Littman
BY
ATTORNEY

July 27, 1926.  
Z. LITTMAN  
TIRE RIM  
Filed Dec. 20, 1924  
1,593,877  
5 Sheets-Sheet 3
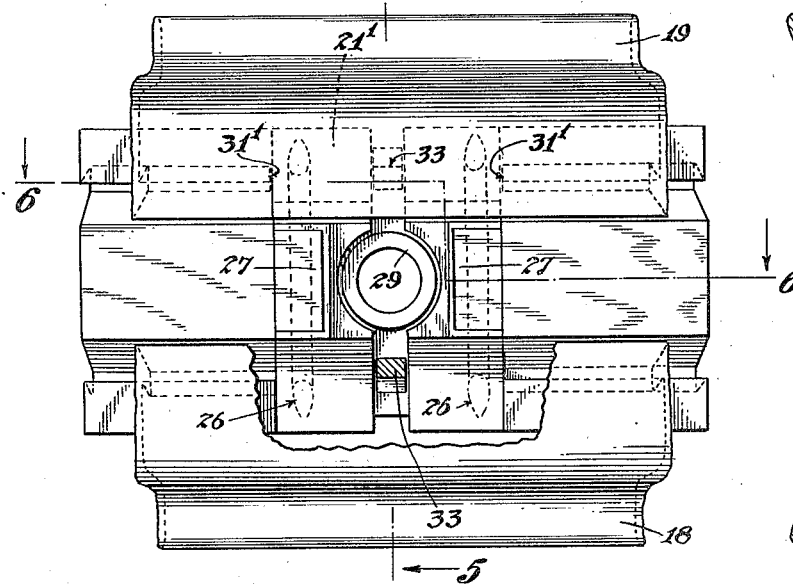
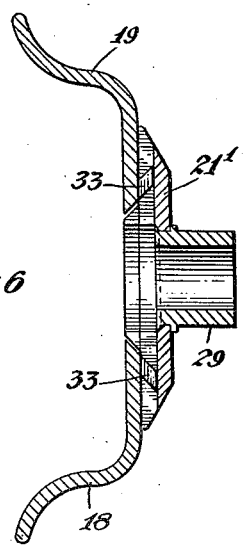
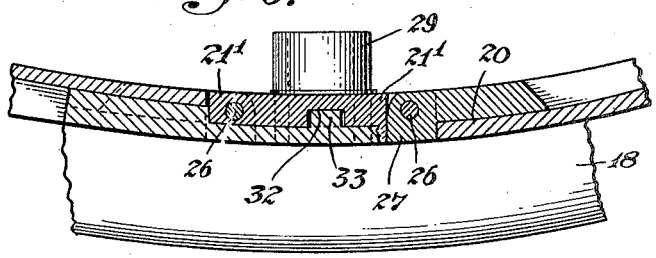
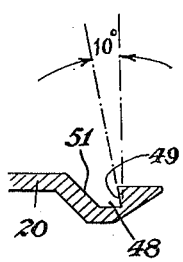
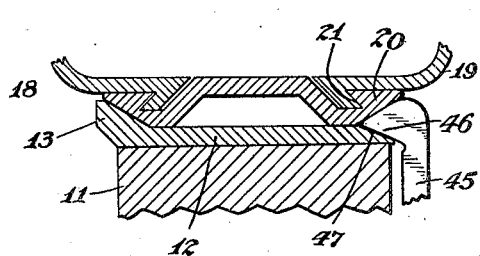
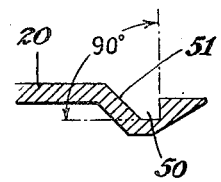
INVENTOR  
Zeno Littman  
BY  
Frank J. Hent  
ATTORNEY

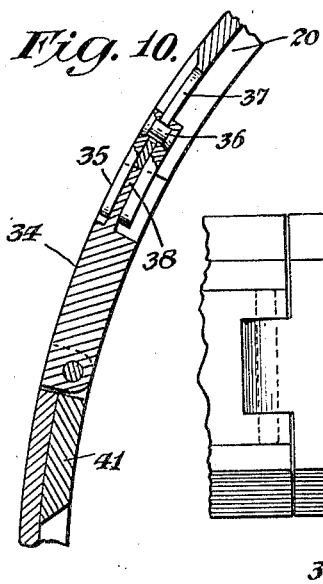
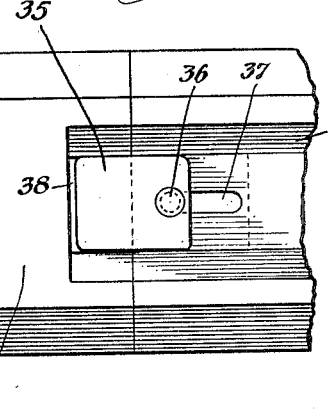
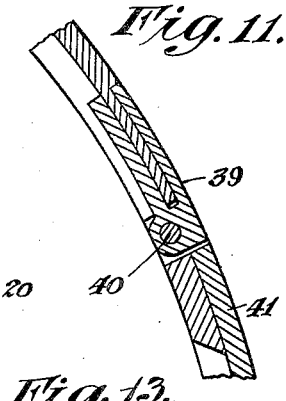
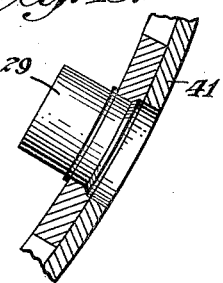
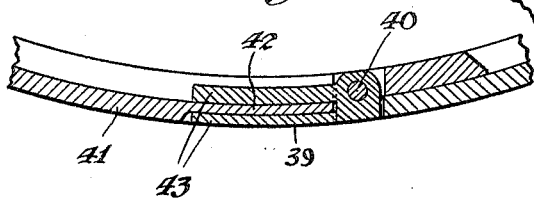
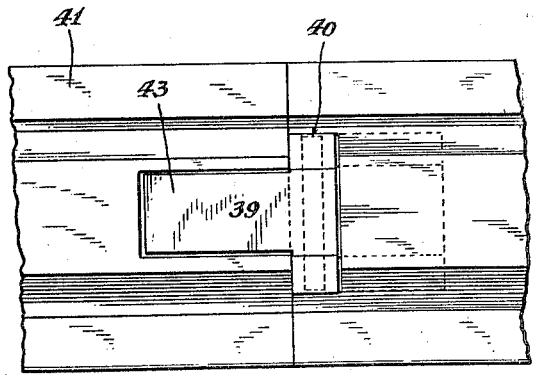

July 27, 1926.

Z. LITTMAN

TIRE RIM

Filed Dec. 20, 1924      5 Sheets-Sheet 5

1,593,877

INVENTOR
Zeno Littman
BY
Frank J. Hunt
ATTORNEY

Patented July 27, 1926.

1,593,877

UNITED STATES PATENT OFFICE.

ZENO LITTMAN, OF NEW YORK, N. Y.

TIRE RIM.

Application filed December 20, 1924. Serial No. 757,097.

This invention relates to tire supporting rims for vehicle wheels and one of the objects of the invention is to provide a structure of this general character which can be readily assembled or disassembled without the use of tools. The invention consists of a construction which includes a rim member made up of three sections, two annular flange sections for providing radial and lateral support for the shoe, and a connecting or locking section adapted to be positioned between the flange sections, and to interlock with the flange sections to hold them in tire supporting position.

A feature of the invention resides in the provision of tongue and groove locking elements on the flange and locking sections, the interengaging parts being formed on angles such that relative movement of the flange members toward or from each other produces a disengagement or engagement of the locking elements. A jointed or sectional construction of the locking section provides for the ready placing of the locking section in position between the flange sections, or for its removal therefrom when the flange sections are forced toward each other to disengaging position.

With the described construction the assembly or disassembly of the tire supporting structure can be readily accomplished by placing the tire on a flat surface and pressing the uppermost flange member toward the other flange member under the weight of the foot of the operator. This action forces the locking ring radially inward to releasing position or places the flanges in position to engage the locking ring and draw it to normal locking position when the pressure is withdrawn.

Other features of the invention will be hereinafter referred to.

In the drawings in which a preferred embodiment of the invention has been selected for illustration, Figure 1 is a view in cross-section of a portion of a vehicle wheel equipped with a tire supporting rim embodying the invention.

Figure 4 is a plan view of a portion of the improved rim.

Figure 5 is a view in cross-section taken on the line 5—5 of Figure 4.

Figure 6 is a view in cross-section taken on the line 6—6 of Figure 4.

Figure 7 is a view in cross-section showing a modified form of rim supporting device.

Figure 8 is a view in cross-section showing a modified form of locking groove.

Figure 9 is a view similar to Figure 8, showing another form of locking groove.

Figures 10, 11 and 12 are views in cross-section showing the construction of hinge joints used in the locking ring.

Figure 13 is a view in longitudinal section showing a valve stem supporting portion of the locking ring.

Figure 14 is a face view of the construction shown in Figure 10.

Figure 15 is a view looking upwardly at the parts shown in Figure 12.

Figure 1:
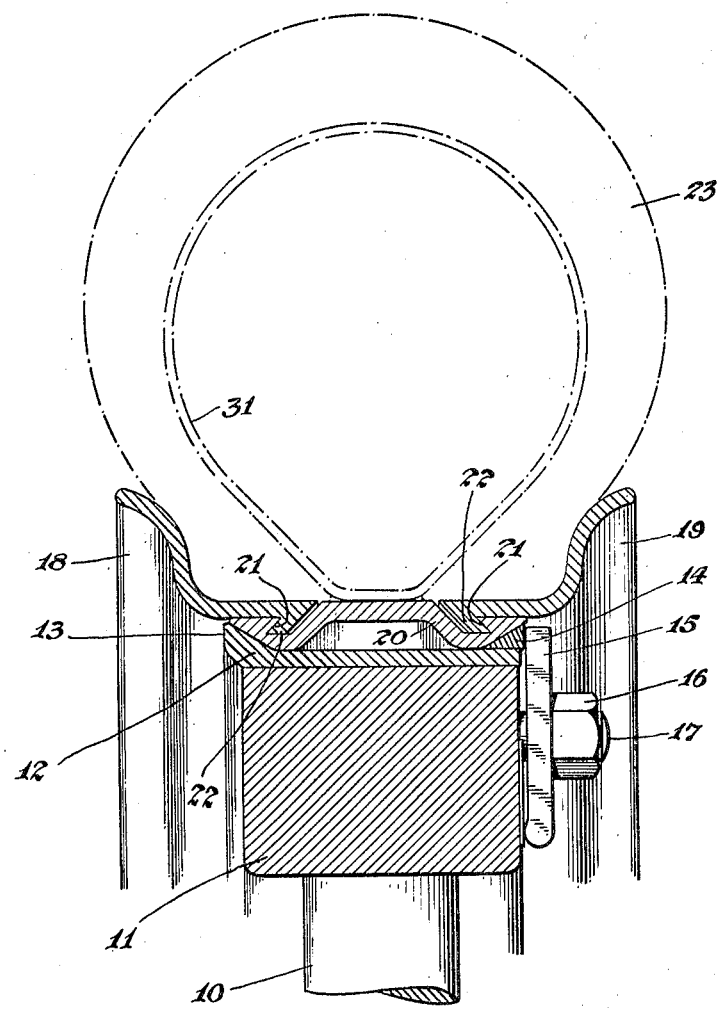

Referring to the drawings for a more detailed description of the invention, in Figure 1 there is shown in section a portion of a vehicle wheel including a spoke 10, a felloe 11 and an annular band or seat 12 carried on the circumferential surface of the felloe 11 and arranged to directly support the tire and its supporting parts. As is usual with demountable rim constructions the seating member 12 is provided at one edge with a flange 13 which has an inclined or wedge-shaped formation on its radially outer surface. The other edge of the seating member 12 is maintained free from radially protruding parts so that the tire supporting elements can be freely slipped into place on the peripheral surface of the member 12. A removable wedging ring 14 is placed on the seating member 12 in the same relation to the tire supporting parts that is provided on the opposite edge of the member 12 by the flange 13, the wedging ring 14 being held in position by the clamping jaws 15 engaged by nuts 16 having threaded relation to bolts or studs 17 projecting in an axial direction from the outer face of the felloe 11.

The invention hereinafter described has to do with the tire supporting elements which are carried on the wheel construction referred to and these elements comprise broadly a pair of tire supporting flange members 18 and 19 cooperating with an intermediate locking section 20. The locking section 20 is provided with locking grooves 21 which are formed adjacent the lateral edges of the locking section in the outer face thereof and are so disposed as to lie in angular positions such that the grooves are inclined toward each other. The flange sections 18 and 19 are provided with tongue members 22 on their inner faces, the tongue members extending outwardly at an angle such as to fit into the angularly disposed grooves 21 formed in the locking section 20. With this construction it will be seen that the interengagement of the tongues 22 with the grooves 21 provides a locking relation of parts which effectively prevents the lateral separation of the flange members 18 and 19 and thereby holds the shoe 23 of the tire securely in its supported position.

Figure 2:
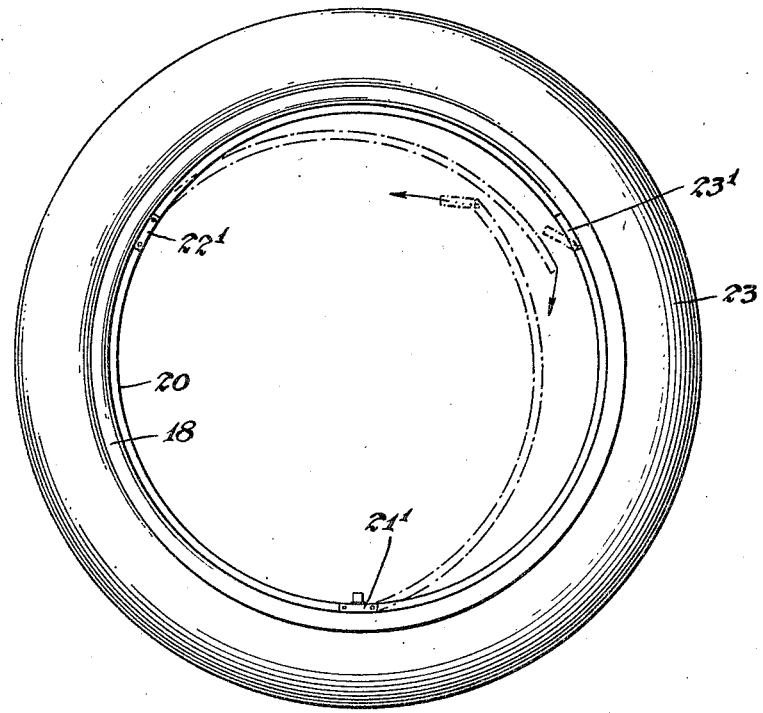
Figure 2 is a view in side elevation of a tire and supporting rim therefor showing an assembled and a collapsed condition of the rim.
Figure 3:
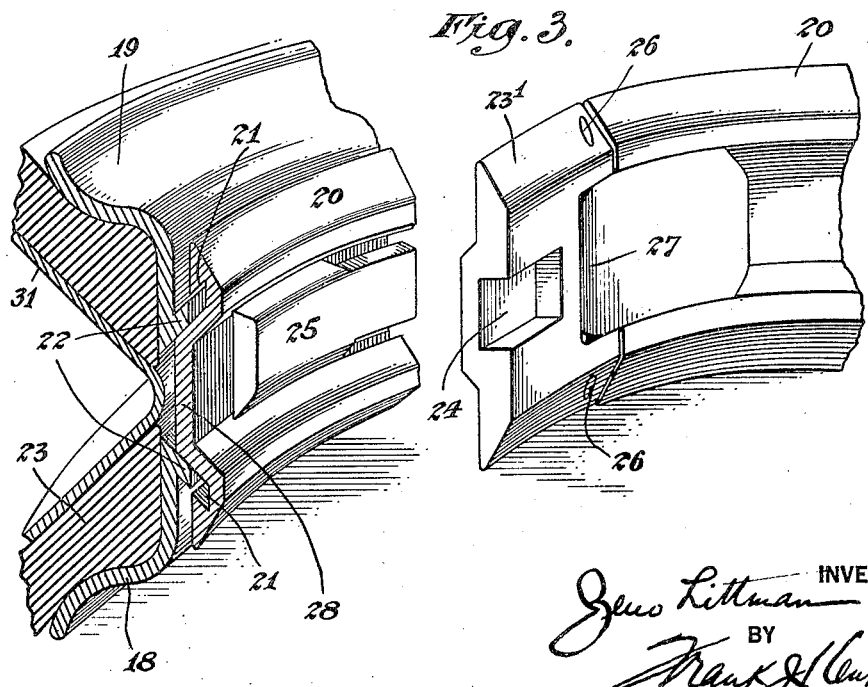
Figure 3 is a detailed view in disassembled relation of a latch construction included in the improved rim.

The locking section 20 must have a jointed or sectional construction in order to permit of its removal from or the placing of it in position in locking relation to the tire supporting flange members 18 and 19. The locking section 20 shown in Figure 2 of the drawing has a jointed or articulated construction which includes relatively short hinge joint sections 21', 22', and 23' whereby the collapse and removal of the locking section 20 may be accomplished as is indicated in dotted lines in Figure 2 already referred to. One of the hinge joint sections of the locking section 20 is provided with a latch or locking device as is indicated in Figure 3 of the drawing. In this figure it will be seen that the hinged section 23' is provided with a slot 24 adapted to receive a slidable tongue member 25 carried on the adjacent end of the abutting portion of the locking section 20. With this arrangement of parts the hinge joint section 23' is held in place in the circle defined by the locking section 20 by the engagement of the slidable tongue member 25 with the slot 24. Upon the movement of the tongue 25 to the left in Figure 3 of the drawing its removal from the slot 24 is accomplished so that the hinge section 23' can be readily swung to a radial inward position about the pintle pin 26 which passes through a projection 27 formed on the locking section 20 to support the pin. The swinging of the hinge section 23' to the inward position shown in Figure 3 can be readily accomplished by prying it from its normal position with any convenient tool such as a screw-driver or the like. It will be clear that when this disruption of the continuity of the circle defined by the locking section 20 has been made the removal of the entire locking section from its position can be readily accomplished. If the flange members 18 and 19 are forced to positions such as that shown in Figure 3 wherein the tongue members 22 are moved inwardly toward each other to clear the corresponding grooves, the locking section 20 may be readily removed from its position in engagement with the flange members, thereby completely releasing the flanges.

The movement of the flange members 18 and 19 toward each other and to disengaging position can be readily effected by the downward pressure of the foot of the operator on the uppermost flange as the assembly lies in a flat position on the roadway or other surface. The inclined disposition of the interengaging parts 21 and 22 not only produces the removal of the tongues 22 from the grooves 21 by the movement toward each other of the flanges 18 and 19, but the camming action of the tongues 21 against the inclined engaged surfaces of the interposed central portion 28 of the locking section 20 causes the locking section 20 to move radially inward and thereby facilitates the removal of the locking section from locking position in engagement with the flange sections 18 and 19.

While the joint section 23' is provided with a latch construction as has been pointed out, the joint section 21' may be provided with a nipple 29 as in Figures 5 and 6 through which the valve stem 30 of the tube 31 may extend. In order to prevent circumferential movement of the hinge joint section 21' with relation to the tire supporting flanges 18 and 19 and thereby prevent injury to the valve stem 30, the tongue portions 22 of the flange members 18 and 19 are interrupted so as to provide ends 31' between which the hinge joint section 21' is interposed. A further locking of the parts against relative circumferential movement is achieved by the provision of a transverse notching or groove 32 formed in the hinge joint section 21' and into which a short section 33 of the locking tongues 22 extends.

In Figure 7 of the drawing there is shown in section a modification of the means shown in Figure 1 for holding the tire supporting parts in position on the seating ring 12. Instead of using a separate wedging ring 14 such as is shown in Figure 1 of the drawing and a clamping member 15, in Figure 7 a clamping member 45 has a wedging portion 46 formed directly thereon so that the locking of the clamping member 45 in position at the same time forces the wedging portion 46 into position between the seating ring 12 and the inner and inclined surface of the locking ring 20. In order to enhance the wedging action of the part 46, the seating member 12 is provided at the edge adjacent the clamping member 45 with an inclined surface 47 so that a double wedging effect is obtained by the forcing of the wedge member 46 into its seat between the seating ring 12 and the locking ring 20, there being a plurality of clamping members 45 in the assembled structure.

In Figures 8 and 9 of the drawing there is shown a modified form of locking groove in the locking ring construction. In Figure 8 the locking groove 48 has its outer surface 49 formed at an angle of substantially ten degrees from the perpendicular so that an inclination or slant of considerably less degrees of sharpness than that used in connection with the locking grooves 21 is obtained. In Figure 9 of the drawing the outer face of the locking groove 50 is formed at right angles to the base or inner end of the groove. The constructions shown in Figures 8 and 9 provide for the ready disassembly of the parts through the camming action produced by the surfaces 51 in contact with the outer faces of the locking tongues 22 in a similar manner to the action obtained in the construction shown in Figures 1 and 3 while the actual separation or engagement of the parts is readily obtained by reason of the wider opening provided in the groove forms shown in Figures 8 and 9.

Referring to Figures 10, 11, 12, 13 and 14 of the drawings, modifications in the form of the hinge joint sections employed are shown. In Figure 10 there is shown a hinge joint section 34 which corresponds to the latch section 23' shown in Figures 2 and 3 of the drawing. The latch device 35 shown in this figure differs somewhat from the latch construction shown in Figure 3. The latch 35 is made up of a forked and slidable latch member which, by means of a pin 36 and slot 37 construction, is slidably mounted in the end of the locking section 20 as is clearly shown in Figures 10 and 14. The double tongue latch 35 is movable into and out of flanking engagement with a tongue member 38 forming an extension of the hinge section 34 as is clearly shown in Figure 10 of the drawing. With this construction removal of the latch 35 to the right-hand end of the slot as shown in Figures 10 and 14 releases the tongue member 35 so that the hinge section 34 can be swung radially inward to initiate the disengagement of the locking section 20 from its flange engaging position.

In Figures 11 and 12 are shown hinge joint sections 39 which, together with the latch joint section 34 of Figures 10 and 14, make up the hinge joint sections of a complete locking ring section. The hinge joint sections 39, in addition to have a pivotal or hinged mounting on the pintle pins 40, have a tongue and groove connection with the adjoining end of the locking ring section 41 with which they are engaged. This construction includes a tongue member 42 formed as an extension of the locking ring section 41 and a pair of jaw members 43 between which the tongue member 42 extends. With this construction not only is a hinge joint provided but a collapsible or separable joint is also obtained so that the ring 41 can be separated into sections in addition to being folded or collapsed on itself.

In Figure 13 of the drawing is shown a valve stem section corresponding to that shown in Figure 6 but occupying a position in the modified ring construction 41 shown in Figures 10 to 14, inclusive. In Figure 15 there is shown a face view looking upwardly at the joint construction shown in Figure 12.

Figure 16:
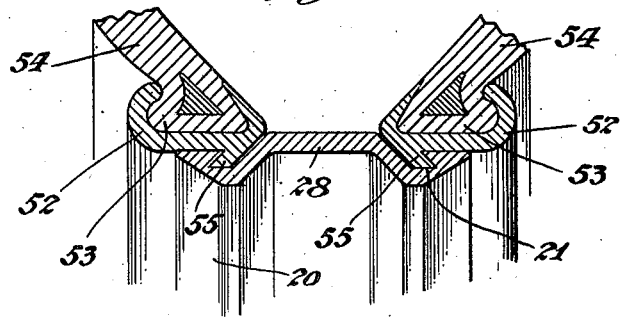
Figure 16 is a view in cross-section showing a modified form of rim construction.

In Figure 16 of the drawing there is shown a modified form of construction in which the tire supporting flange members 18 and 19 of Figure 1 are displaced by a pair of annular rim members 52 clinched into permanent engagement with the edges 53 of the shoe 54 and intended to be manufactured and sold as an integral part of the shoe structure. The rim members 52 are provided with radially inward and axially extending tongue members 55 similar to the tongue members 22 already referred to. The tongue members 55 are formed to engage the inclined grooves 21 in the locking ring 20 as already described.

Figure 17:
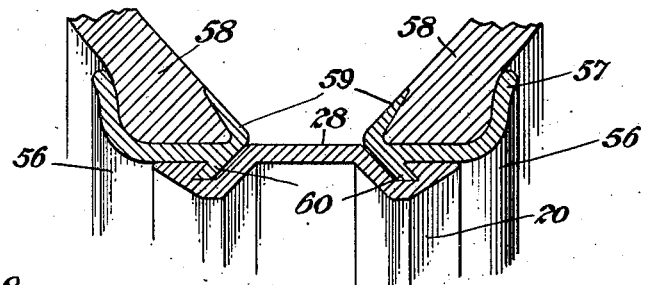
Figure 17 is a view similar to Figure 16 showing still another form of rim construction.

In Figure 17 of the drawing a somewhat similar construction to that disclosed in Figure 16 is shown. Rim members 56 similar to the rim members 52 of Figure 16 are shown in which the flange portions 57 stand radially outward to form straight side flange members similar to those in prior use. The rim members 56 may also be formed as a permanent part of a shoe 58 construction and for this purpose are provided with inner flange members 59 which engage the inner surface of the edge portions of the shoe. Tongue members 60 are provided on the rim members 56 similar to the tongue members 55 on the rim members 52 of Figure 16.

Figure 18:
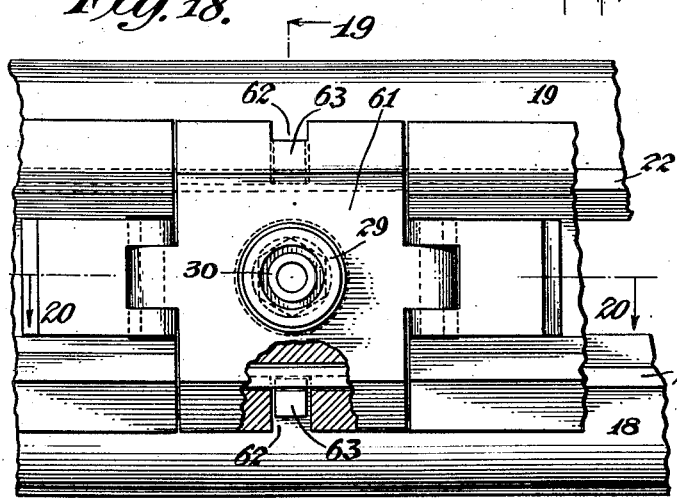
Figure 18 is a view similar to Figure 4 showing a modified form of the valve stem supporting section.
Figure 19:
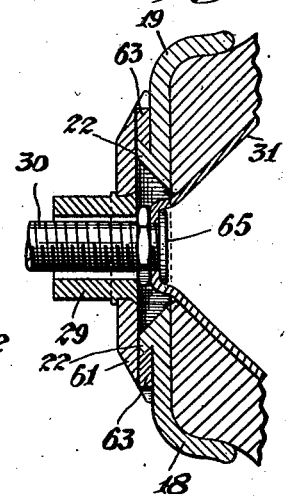
Figure 19 is a view in cross-section taken on the line 19—19 of Figure 18.
Figure 20:
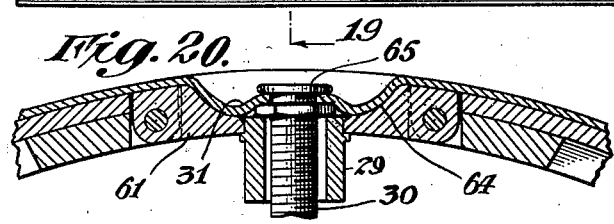
Figure 20 is a view in longitudinal section taken on the line 20—20 of Figure 18.

In Figures 18, 19 and 20, a modified form of hinge joint section for supporting the valve stem parts is shown. The construction shown in these figures represents a modification of the construction shown in Figures 4, 5 and 6 and includes a hinge joint section 61 which does not depend upon an interruption of the tongue members 22 of the flanges 18 and 19 but is provided with slots or notches 62 in its lateral edges which receive abutment blocks 63 attached to the flange members 18 and 19 in any suitable manner as by welding. With this construction circumferential movement of the hinge section 61 with relation to the flange members 18 and 19 is prevented.

Another useful feature of the construction shown in Figure 18 resides in a hollowed-out formation of the outer side of the hinge block section 61 such as is shown at 64 in Figure 20 of the drawing. This hollowed-out recess or seat is designed to receive the flange head portions of the valve stem 30 whereby the valve stem is attached to the rubber tube 31. The result is that the headed construction 65 of the valve stem lies beneath the floor or bottom of the tire rim and radially inwardly from the outer periphery thereof so that the valve parts do not extend radially beyond the circumference of the rim into position to injure the tube or other tire parts in the event that it is necessary to operate the vehicle with a flat tire.

Not only does the rim construction described provide for a rapid and easy disassembling of the parts when occasion requires, but the interlocking relation between the locking ring and rim flanges is such that the completion of the ring by forcing the hinge section 23 into abutting relation with the adjacent end of the ring 20, produces an expanding movement of the locking ring which forces the rim flanges outwardly to their normal shoe-supporting position. Thus not only does manipulation of the rim flanges, when the hinged section 23 is unlatched, force the locking ring inwardly to released position, but a reversal of the conditions, that is, the forcing of the locking ring to its complete and expanded position forces the rim flanges to their tire supporting positions and holds the flanges rigidly in place.

What I claim is :—

1. In a pneumatic tire supporting rim for vehicle wheels, a pair of annular flange members adapted to provide radial and lateral support for the edge portions of the shoe, a locking ring section adapted to be placed between said annular flange members to hold the flange members in operative position, and said flange members and locking ring being provided with interengageable tongue and groove locking elements occupying inclined positions to prevent lateral separation of the flange members.

2. In a pneumatic tire supporting rim for vehicle wheels, a pair of annular flange members adapted to provide radial and lateral support for the edge portions of the shoe, a locking ring section adapted to be placed between said annular flange members to hold the flange members in operative position, and said flange members and locking ring being provided with interengageable locking elements extending inward and axially outward to prevent lateral separation of the flange members.

3. In a penumatic tire supporting rim for vehicle wheels, a pair of separable annular flange members adapted to provide radial and lateral support for the edge portions of the shoe, a locking ring section adapted to be placed between said annular flange members to hold the flange members in operative position, said locking ring being provided adjacent each lateral edge with an inward and outwardly extending groove, and each of said flange members being provided adjacent its inner edge with a tongue member formed to enter a groove in the locking ring.

4. In a pneumatic tire supporting rim for vehicle wheels, a pair of separable annular flange members adapted to provide radial and lateral support for the edge portions of the shoe, a locking ring adapted to be placed between the flange members to hold the flange members in operative position, and said flange members and locking ring being provided with interengagable locking elements so formed as to force the locking ring radially inward when the flange members are moved toward each other.

5. In a pneumatic tire supporting rim for vehicle wheels, a pair of separable annular flange members adapted to provide radial and lateral support for the edge portions of the shoe, a locking ring adapted to be placed between the flange members to hold the flange members in operative position, said locking ring having an elevated central section adapted to lie flush with the bases of the flange members and to support the tire tube, said locking ring having laterally extending wing members, interengageable tongue and groove elements on the flange members and the wing members of the locking ring, and said central section of the locking ring having inclined side walls converging toward the radial outer surface whereby to provide cam surfaces adapted to force the locking ring inwardly when the flange members are forced toward each other.

6. In a pneumatic tire supporting rim for vehicle wheels, a pair of separable annular flange members adapted to provide radial and lateral support for the edge portions of the shoe, a collapsible locking ring adapted to be placed between said annular flange members to hold said flange members in operative position, said flange members and locking ring being provided with interengageable tongue and groove elements extending inward and axially outward, said locking ring including hinged sections, and one of said sections being movable to open the ring, said section being provided with latching means including spaced apart jaw members movable circumferentially into and out of flanking relation to the opposite end of the ring.

7. A collapsible locking ring for tire supporting members comprising ring sections having hinged connections with each other, and one of the hinge elements of one section having a circumferentially separable tongue and groove connection with an end of the adjoining section.

8. In a locking ring for tire supporting rims, a hinged section having a depression in its radially outward surface in which to receive the inner valve stem parts.

9. In a tire supporting rim, a pair of separable flange members for supporting the edges of the shoe, a locking ring section having tongue and groove connections with the flange members, said locking ring including a hinged section having an opening therethrough and a depression in its radial outer surface in which to receive the inner valve stem parts, said hinged section being provided with notches in its opposite side portions, and said flange members having lugs arranged to occupy positions in said notches.

10. A pneumatic tire supporting rim provided with a depressed seat in its outer peripheral surface in which to receive valve stem parts and prevent the projection of the parts beyond the periphery of the rim.

11. In a tire supporting rim, a pair of separable flange members for supporting the edges of the tire shoe, and a jointed ring section adapted to be placed between said flange members and to have locking engagement therewith, the locking connection of the jointed ring with the flange members being such that movement of the ring to its fully expanded condition forces the flanges to tire supporting position.

12. In a tire supporting rim, a pair of separable flange members for supporting the edges of the tire shoe, and a ring section adapted to be placed between said flange members and to have locking engagement therewith, the locking connection being so formed that pressure of the tire tending to separate the flange members has the effect of rendering the locking action fully effective.

In testimony whereof I affix my signature.

ZENO LITTMAN.